US012589409B2

(12) United States Patent
Costa et al.

(10) Patent No.: US 12,589,409 B2
(45) Date of Patent: Mar. 31, 2026

(54) DEVICE AND METHODS FOR PRODUCING EDGE PROTECTION COATINGS, THE DEVICE HAVING A FLEXIBLE BASE PLATE, A CHANNEL, AND A SEALING LIP

(71) Applicant: MANKIEWICZ GEBR. & CO. (GMBH & CO. KG), Hamburg (DE)

(72) Inventors: Philipp Costa, Hamburg (DE); Alexander Weinhold, Hamburg (DE); Jochen Wehner, Hamburg (DE)

(73) Assignee: MANKIEWICZ GEBR. & CO. (GMBH & CO. KG), Hamburg (DE)

( * ) Notice: Subject to any disclaimer, the term of this patent is extended or adjusted under 35 U.S.C. 154(b) by 80 days.

(21) Appl. No.: 17/778,410

(22) PCT Filed: Dec. 10, 2020

(86) PCT No.: PCT/DE2020/101050
§ 371 (c)(1),
(2) Date: May 20, 2022

(87) PCT Pub. No.: WO2021/115539
PCT Pub. Date: Jun. 17, 2021

(65) Prior Publication Data

US 2022/0410206 A1 Dec. 29, 2022

(30) Foreign Application Priority Data

Dec. 12, 2019 (DE) ..................... 10 2019 134 132.9

(51) Int. Cl.
*B05C 17/005* (2006.01)
*B05C 5/02* (2006.01)
(Continued)

(52) U.S. Cl.
CPC ................ *B05D 1/28* (2013.01); *B05C 5/027* (2013.01); *B05C 11/028* (2013.01);
(Continued)

(58) Field of Classification Search
CPC ....... B05C 17/10; B05C 11/04; B05C 11/045; B05C 17/00516; B05C 5/027; B05D 3/12;
(Continued)

(56) References Cited

U.S. PATENT DOCUMENTS 1,049,797 A * 1/1913 Arntt ....................... A47L 13/22 401/140
1,196,437 A * 8/1916 Doyle ..................... B41F 35/06 15/309.1
(Continued)

FOREIGN PATENT DOCUMENTS

CN 2668281 Y 1/2005
CN 104289390 A 1/2015
(Continued)

*Primary Examiner* — Karl Kurple
(74) *Attorney, Agent, or Firm* — Norman B. Thot

(57) ABSTRACT

A device for applying at least one coating material to a substrate surface. The device includes a flexible base plate having a toothing which is mounted on at least one side of the flexible base plate as a toothed side, a channel which is arranged parallel to the toothed side, and at least one sealing lip which is arranged on a side of the channel which faces away from the toothed side.

15 Claims, 2 Drawing Sheets

(51) Int. Cl.
*B05C 11/02* (2006.01)
*B05C 11/04* (2006.01)
*B05D 1/28* (2006.01)

(52) U.S. Cl.
CPC ...... *B05C 11/045* (2013.01); *B05C 17/00516* (2013.01); *F05D 2230/90* (2013.01)

(58) Field of Classification Search
CPC ....... A46B 11/063; A46B 11/06; A47L 13/22; F05D 2230/90
USPC ......... 156/575, 535, 908, 390, 574; 401/282
See application file for complete search history.

(56) References Cited

U.S. PATENT DOCUMENTS

| | | | | | |
|---|---|---|---|---|---|
| 1,333,741 | A * | 3/1920 | Thomas | A47L 13/22 | 401/290 |
| 2,171,591 | A * | 9/1939 | Minich | A46B 7/04 | 156/80 |
| 2,641,011 | A * | 6/1953 | Caronia | A46B 11/0013 | 401/270 |
| 3,341,878 | A * | 9/1967 | Hubbard | E04F 21/06 | 404/97 |
| 3,806,261 | A * | 4/1974 | Soultanian | A47L 13/30 | 401/136 |
| 3,811,783 | A * | 5/1974 | Johnson | A46B 11/0013 | 401/196 |
| 4,097,951 | A * | 7/1978 | Hurtt | B05C 17/10 | 15/245.1 |
| 4,502,304 | A * | 3/1985 | Hopkins | D06B 19/0094 | 68/900 |
| 5,593,091 | A * | 1/1997 | Harris | B01F 35/833 | 239/304 |
| 5,611,102 | A * | 3/1997 | Lesinsky | E04F 21/06 | 15/245.1 |
| 5,937,628 | A * | 8/1999 | Matechuk | E04F 21/244 | 56/400.05 |
| 6,325,563 | B1 * | 12/2001 | Matechuk | A47G 27/0487 | 15/228 |
| 6,698,961 | B2 * | 3/2004 | Pollock | A46B 11/063 | 401/289 |
| 7,223,038 | B2 * | 5/2007 | Livingstone | E04F 21/02 | 401/278 |
| 7,690,070 | B2 * | 4/2010 | Jung | B25G 3/38 | 401/270 |
| 9,265,923 | B2 * | 2/2016 | Boone | A61M 35/006 | |
| 11,014,202 | B1 * | 5/2021 | Petersen | F03D 80/00 | |
| 2006/0005339 | A1 * | 1/2006 | Livingstone | B05C 17/10 | 15/245.1 |
| 2008/0159870 | A1 | 7/2008 | Hong | | |
| 2012/0121315 | A1 | 5/2012 | Haack | | |
| 2013/0047381 | A1 * | 2/2013 | Zorn | B25G 1/06 | 16/430 |
| 2017/0239682 | A1 | 8/2017 | Muller et al. | | |
| 2021/0130647 | A1 | 5/2021 | Weinhold et al. | | |
| 2021/0324829 | A1 * | 10/2021 | Ramanujam | B29C 65/52 | |
| 2022/0154685 | A1 * | 5/2022 | Ramanujam | F03D 1/06495 | |
| 2022/0186706 | A1 * | 6/2022 | Lohse | B29C 65/4865 | |
| 2023/0048890 | A1 * | 2/2023 | Jensen | B05C 11/1036 | |

FOREIGN PATENT DOCUMENTS

| | | | |
|---|---|---|---|
| CN | 204159501 | U | 2/2015 |
| CN | 109482412 | A | 3/2019 |
| DE | 103 30 606 | A1 | 1/2005 |
| DE | 20 2018 001 242 | U1 | 5/2018 |
| DE | 10 2017 003 034 | A1 | 10/2018 |
| GB | 1 517 239 | A | 7/1978 |
| JP | 10-193220 | A | 7/1998 |
| JP | 11-057562 | A | 3/1999 |
| WO | WO 2008/157013 | A1 | 12/2008 |

* cited by examiner

DEVICE AND METHODS FOR PRODUCING EDGE PROTECTION COATINGS, THE DEVICE HAVING A FLEXIBLE BASE PLATE, A CHANNEL, AND A SEALING LIP

CROSS REFERENCE TO PRIOR APPLICATIONS

This application is a U.S. National Phase application under 35 U.S.C. § 371 of International Application No. PCT/DE2020/101050, filed on Dec. 10, 2020 and which claims benefit to German Patent Application No. 10 2019 134 132.9, filed on Dec. 12, 2019. The International Application was published in German on Jun. 17, 2021 as WO 2021/115539 A1 under PCT Article 21(2).

FIELD

The present invention relates to devices and methods for applying coatings to highly curved component surfaces. The present invention in particular relates to devices and methods for applying a coating material to or on the edges of a component, in particular to devices and methods for applying an erosion protection coating material. The present invention further relates to the use of these coatings as erosion protection of components which move in gaseous or liquid media, in particular the use as an edge protection for rotor blades, wings or hydrofoils.

BACKGROUND

Surfaces of objects which are exposed to mechanical stress by erosion are generally provided with erosion protection. The term erosion is hereafter defined as the damage of a material caused by liquid or solid substances moving in the shape of drops or particles within a gaseous or liquid medium. A well-known example is erosion by rain, hail, dust or sand on rotor blades of wind turbines and helicopters, on aircraft wings, and on marine screw propellers.

The resistance of surfaces to erosion is achieved by the application of coatings which are sufficiently elastic to absorb the impact forces and which at the same time show sufficient hardness and abrasion resistance. The entire surface of a component, for example, a rotor blade, can be coated with these erosion protection coatings. It is, however, also possible to coat only particularly exposed surface areas of the component, such as, for example, the front edge of the rotor blade.

The terms edge protection and edge protection coating are hereafter defined as a coating applied to the edge of a component, in particular an erosion protection coating. The edge is referred to as the section of a component where two surfaces abut one another.

The front edges of rotor blades, wings or hydrofoils are usually highly curved surfaces to which the application of liquid or pasty coating materials is difficult. WO 2008/157013 describes methods for applying pasty repair lacquers to a rotor blade via an applicator. These applicators are used for repairing erosion damage to the rotor blade coatings. In order to maintain the aerodynamic properties of the rotor blades, the depressions, abrasions or holes caused by erosion must be levelled out in the coating without impairing the shape of the blade through the application of excess material. During a repair process, only the damaged sections of a coating are generally repaired, the latter being rather small in comparison to the total surface. Commonly known applicators are not suitable for applying an edge protection coating, which must have a uniform layer thicknesses over the entire length of a rotor blade.

SUMMARY

An aspect of the present invention is to provide improved devices and methods for producing erosion protection coatings, in particular edge protection coatings.

In an embodiment, the present invention provides a device for applying at least one coating material to a substrate surface. The device includes a flexible base plate comprising a toothed surface which is mounted on at least one side of the flexible base plate as a toothed side, a channel which is arranged parallel to the toothed side, and at least one sealing lip which is arranged on a side of the channel which faces away from the toothed side.

BRIEF DESCRIPTION OF THE DRAWINGS

The present invention is described in greater detail below on the basis of embodiments and of the drawings in which.

DETAILED DESCRIPTION

Figure 1:
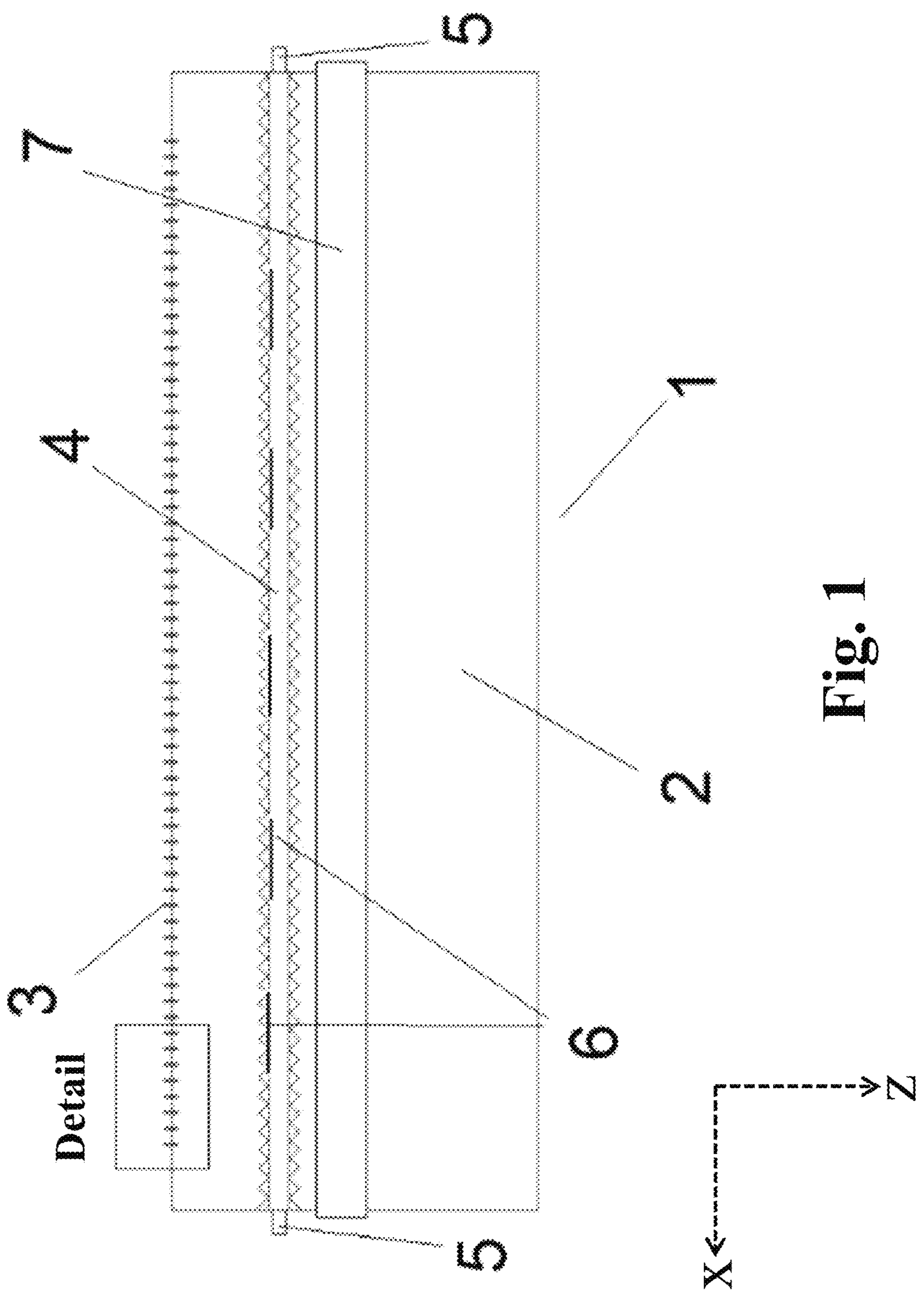
FIG. 1 shows a doctor blade according to the present invention.

The device according to the present invention is designed in the manner of a doctor blade so that liquid or pasty materials, such as, for example, coating materials, can be applied uniformly and continuously to a curved substrate surface. With the aid of the device according to the present invention, materials can easily be applied to or on the edges of a component. The device has a base plate made of a flexible material, with a toothed surface being attached to at least one of its sides. On the base plate, a channel with at least one filler nozzle and several outlets parallels the toothed side. The coating material, such as a liquid or a pasty coating material, is conducted via the filler nozzle and is then applied to the surface of the component via the outlets. A sealing lip is arranged on the side of the channel which faces away from the toothed side, the sealing lip preventing an undesired escape of the material or coating material.

Suitable materials for the base plate are sufficiently flexible and chemical-resistant plastics. The term resistance to chemicals is hereafter defined as the property of substances to withstand stress caused by chemicals without reducing the functional value. In an embodiment, the employed plastic material can, for example, be resistant to the action of constituents of the coating material compositions, in particular resistant to the action of coating materials from which erosion protection coatings are produced. The term coating material is hereafter defined as a liquid or pasty composition which, after having been applied to a substrate, forms a coating through curing. The curing process comprises both drying by evaporating the solvents and the chemical reaction of constituents of the composition.

Due to its special design, the device according to the present invention can be adapted very precisely to the contours of the component to be coated. In an embodiment of the present invention, the flexible base plate has a bending radius of up to 10 mm. In particular plastics with elasticity modules in the range of 1000 to 1600 MPa, for example, 1050 to 1550 MPa, for example, 1100 to 1500 MPa, are therefore employed.

The toothed surface according to the present invention consists of a structure which is arranged on one or more sides of the base plate. It can be attached to only one of the sides or, additionally, to the adjoining sides. The toothed surface comprises a number of teeth which are mounted with a tooth width (h) and a distance (i) parallel to one another on the base plate. The tooth width (h) is in the range from 0.2 to 0.7 mm, for example, from 0.3 to 0.6 mm, for example, from 0.4 to 0.5 mm. The distance (i) between two teeth is 1.6 to 2.6 mm, for example, 1.8 to 2.4 mm, for example, 2.0 to 2.2 mm.

The teeth are designed so that they are perpendicular to the plate and have a height (e). The teeth furthermore have a length (g), with a length section projecting beyond the side edge of the plate. According to the present invention, the length of this section, which corresponds to the tooth length (f), can, for example, correspond to the tooth height (e). The tooth height (e) and the tooth length (f) are in the range from 0.2 to 5.0 mm. Depending upon the viscosity of the employed coating material, the layer thickness of the applied liquid or pasty coating material can be determined through the selected ratio of tooth height (e) to distance (i). This is referred to below as wet film layer thickness.

Protective coatings are generally thick-layered and have dry film layer thicknesses of between 100 and 1000 μm. The term dry film layer thickness is hereafter defined as the thickness of the cured or dried coating. In order to produce such protective coatings, the employed coating materials must therefore be applied in corresponding wet film layer thicknesses.

Edge protection coatings for wings or rotor blades must in particular not impair the aerodynamics of these components, i.e., coating materials must be applied so that the coating on the heavily stressed front edge has the required layer thickness. The layer thickness should also be as low as possible on the wing or rotor blade surfaces in order to avoid impairments due to changes in the aerodynamic profile of the wings or rotor blades. The dry film layer thicknesses at the front edges can, for example, be in the range of between 100 and 2000 μm, while the dry film layer thicknesses on the surfaces can, for example, be below 50 μm. In an embodiment, the device according to the present invention has tooth-free sections at the outer edges of the toothed side of the base plate in order to obtain these layer thickness profiles. The length ratio of the edge-side, toothless sections to the central, toothed section is selected according to the desired layer thickness profile and the shape of the component to be coated.

In an embodiment of the present invention, the teeth can, for example, be designed to be round and/or oval on one side or on both sides. It has surprisingly been found that teeth with a lower bearing surface on the substrate are particularly advantageous. This circumstance reduces the risk of slipping of the device during the application, while only thin striae are produced which may easily vanish. The term striae is hereafter defined as the lines where no or only very little material can be applied, since the teeth which rest on the substrate prevent these areas from being covered during the application process.

In an embodiment, the device according to the present invention can, for example, have a channel which is arranged parallel to the toothed side and through which the coating material to be applied is conducted. The channel on the side facing the toothed side also has several openings through which the conducted coating material can flow off. These outlets can, for example, be arranged in a repeating pattern so that the coating material is uniformly applied to the substrate. The channel can have at least one filler nozzle in order to allow a continuous supply. The channel can, for example, be provided with two filler nozzles, each of which is attached to its opposite end. The device may be connected to a dosing system via the filler nozzle which allows a uniform, predetermined supply of the coating material.

The channel according to the present invention further shows suitable cross sections in order to keep the flow resistance of the coating material as low as possible. The size of the cross section of the channel as well as the size of the outlets are thus dependent upon the properties of the coating material, such as, for example, the viscosity.

In an embodiment, the channel can, for example, be designed to be flexible in order not to impede the movement of the flexible base plate. Suitable embodiments are tubular or undulating elements having a sufficient stability in order to provide a uniform material flow during the application process. The channel can, for example, be designed as a corrugated hose or a corrugated pipe.

The flexible base plate can, for example, comprise a top side, a bottom side which is arranged opposite to the bottom side, a front side, a back side which is arranged opposite to the front side, a left side, a right side which is arranged opposite to the left side, and a toothed surface comprising a plurality of teeth, the toothed surface being mounted on at least two of the sides of the flexible base plate as a toothed side The toothed side can, for example, be arranged on the top side of the flexible base plate so that the plurality of teeth of the toothed surface extend in a direction parallel to a direction of each of the left side and the right side and extend perpendicular to a direction of a plane of the top side and to a direction of a plane of the bottom side, and on the front side of the flexible base plate so that the plurality of teeth of the toothed surface extend parallel to a direction of a plane of each of the left side and the right side and extend perpendicular to a direction of a plane of the front side.

The plurality of teeth which are arranged on the top side of the flexible base plate so as to extend parallel to each of the left side and the right side and perpendicular to the top side and to the bottom side each have a height section which extends above the top side of the flexible base plate The plurality of teeth which are arranged on the front side of the flexible base plate so as to extend parallel to each of the left side and the right side and perpendicular to the front side and to the back side each have a length section which projects beyond the front side of flexible base plate. The plurality of teeth can, for example, each be individually mounted.

In an embodiment, the channel can, for example, be mounted at a certain distance to the toothed side. During the application process, a reservoir for the coating material is thereby formed between the substrate surface and the device according to the present invention. The mentioned distance and consequently also the size of the reservoir are chosen so that the employed coating material may flow off continuously and uniformly through the outlets.

The device can, for example, furthermore have at least one sealing lip which is arranged on the side of the channel which faces away from the toothed side. The sealing lip delimits the reservoir and avoids an undesired flowing off or a leakage of the coating material.

The drawings schematically illustrate an exemplary embodiment of the device according to the present invention. FIG. 1 shows a doctor blade (1) according to the present invention. The flexible base plate (2) has a toothed surface (3) on one side. Furthermore, a channel (4) is mounted on the flexible base plate (2). At each of its two ends, the channel (4) has one filler nozzle (5). Several outlets (6) are arranged on the side of the channel (4) facing the toothed surface (3). A sealing lip (7) is mounted on its opposite side.

Figure 2:
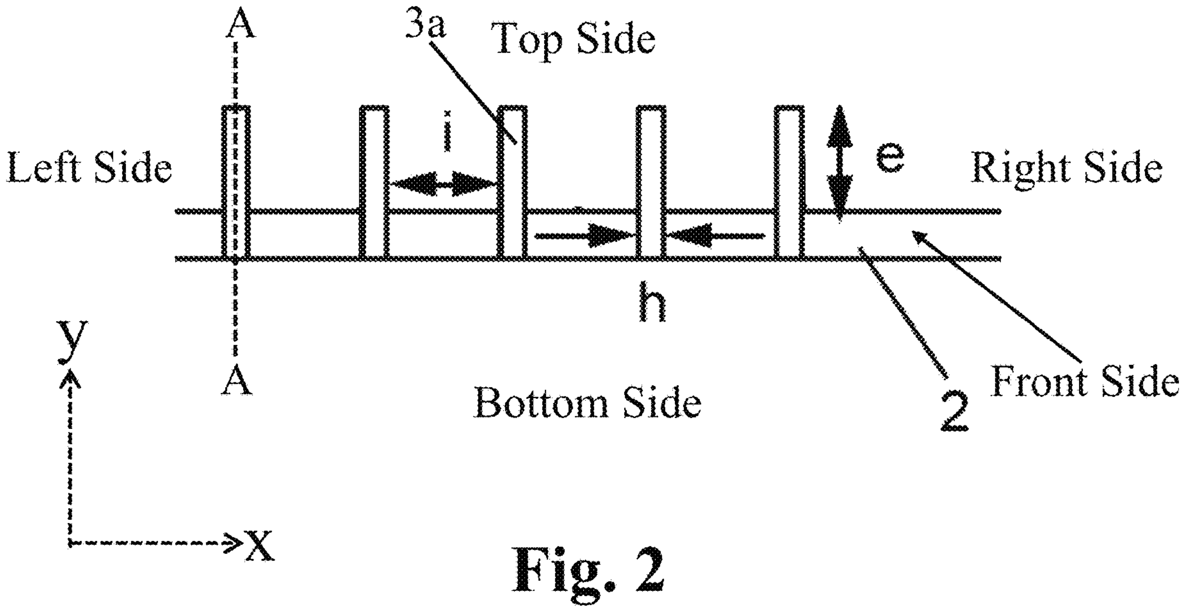
FIG. 2 shows the enlarged detail of the toothed side of the doctor blade in a plan view.

FIG. 2 shows the enlarged detail of the toothed side of the doctor blade (3) in a plan view. The toothed surface comprises a number of teeth (3*a*) which are fitted with a tooth width (h) and a distance (i) parallel to one another on the flexible base plate (2). The teeth (3*a*) are designed so that they project beyond the flexible base plate (2) by a length which is hereafter defined as tooth length (f).

Figure 3:
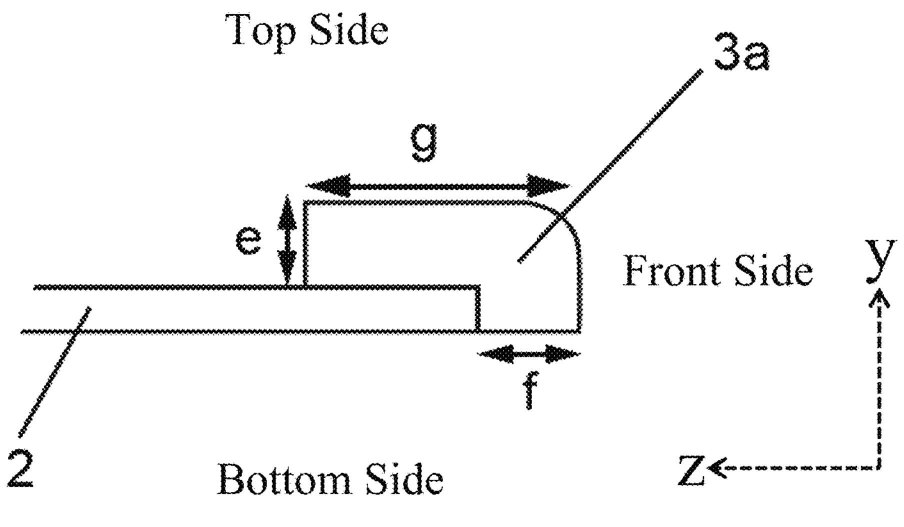
FIG. 3 shows one of the teeth of the doctor blade in cross section as viewed along the line A-A shown in FIG. 2.

FIG. 3 shows one of the teeth (3*a*) of the doctor blade in cross section. The tooth (3*a*) is designed so that it is perpendicular to the flexible base plate (2) and has a height (e). The tooth (3*a*) has a total length (g), with a length section defined as tooth length (f) projecting beyond the side edge of the flexible base plate (2). In the shown embodiment, the tooth length (f) is equal to the tooth height (e).

The device according to the present invention can in particular be used for applying coating materials to or on edges of a component. Due to its properties, the device can easily adapt to the contours of highly curved surfaces, for example, on edges of components. A continuous and uniform application of coating material is thus achieved, as is required for producing protective coatings, in particular for producing coatings for erosion protection at the front edges of rotor blades, wings or hydrofoils. With the aid of the device according to the present invention, coating materials can be applied without interruption and in a constant layer thickness profile as was described above.

In an embodiment of the present invention, the device can, for example, be employed in methods for producing a protective coating. The methods comprise the following steps:

(a) providing a coating material;

(b) applying the coating material to a component via the device according to the present invention; and (c) curing the applied coating material until a coating is obtained.

The method according to the present invention allows the production of thick-layered protective coatings which show dry film layer thicknesses in the range from 100 to 2000 μm, for example, 300 to 1500 μm, for example, 450 to 1000 μm, for example, 600 to 750 μm. These layer thicknesses are hereby generated, for example, at the edges of a component, for example, at the front edges of hydrofoils, wings and rotor blades.

Coating materials which are suitable for the use in the method show sufficient flowability and can be free of solvents. In the case of solvent-free compositions, the dry film layer thickness corresponds to the wet film layer thickness. Coating materials for producing erosion protection coatings can, for example, be employed according to the present invention.

Particular preference is given to the use of coating material compositions as are described in German patent application DE 102017003034 A1. In each case, these compositions have a parent component containing trifunctional polycaprolactone polyols, polycarbonate diols or polycaprolactone polyols as well as polycarbonate diols as binders, and a hardener component containing crystallization-resistant, isocyanate-functional prepolymers as a curing agent. The compositions for producing an erosion protection coating which are described in DE 102017003034 A1 are hereby expressly incorporated by reference.

According to the present invention, the coating material can, for example, be applied to only one part of the surface of the component in step (b). The coating material can, for example, be applied to or on the edges of the component.

The curing of the applied coating material until a coating is obtained can, for example, be carried out in step (c) at a temperature in the range from 10 to 70° C., for example, in the range from 15 to 26° C., for example, in the range from 40 to 70° C., in particular from 50 to 65° C.

The use of the method according to the present invention can, for example, be used for coating the edges of rotor blades, wings or hydrofoils, in particular for coating edges which are exposed to erosion to a great extent.

The present invention is not limited to embodiments described herein; reference should be had to the appended claims.

LIST OF REFERENCE SIGNS

1 Doctor blade
2 Flexible base plate
3 Toothed surface
3*a* Tooth
4 Channel
5 Filler nozzle
6 Outlet
7 Sealing lip
e Tooth height
f Tooth length
g Total length
h Tooth width
i Distance

What is claimed is:

1. A device for applying at least one coating material to a substrate surface, the device comprising:

a flexible base plate comprising,
 a top side,
 a bottom side which is arranged opposite to the top side,
 a front side,
 a back side which is arranged opposite to the front side,
 a left side,
 a right side which is arranged opposite to the left side, and
 a toothed surface comprising a plurality of teeth, wherein,
  the toothed surface is mounted on at least two of the sides of the flexible base plate as toothed sides;
  each of the plurality of teeth have a length, a width, and a height;
  the plurality teeth are arranged to have a spacing between each other in a width direction of each of the plurality of teeth along the front side of the flexible base plate and the top side of the flexible base plate,
  a length section of the length of each of the plurality of teeth project beyond the front side of the flexible base plate, and
  a height section of the height of the plurality of the teeth extend above the top side of the flexible base plate, a flexible channel which is arranged parallel to a first toothed side, the flexible channel comprising a first filler neck arranged on the left side, a second filler neck arranged on the right side, and a plurality of outlets on a side facing the first toothed side;

the first filler neck and the second filler neck are configured to connect to a supply of the at least one coating material; and the at least one coating material is applied to the substrate surface via the plurality of outlets; and at least one sealing lip which is arranged on a side of the flexible channel which faces away from the first toothed side, wherein at least one of the toothed sides is arranged at least, on the top side of the flexible base plate so that the plurality of teeth of the toothed surface extend in a direction parallel to a direction of each of the left side and the right side and extend perpendicular to a direction of a plane of the top side and to a direction of a plane of the bottom side, and on the front side of the flexible base plate so that the plurality of teeth of the toothed surface extend parallel to a direction of a plane of each of the left side and the right side and extend perpendicular to a direction of a plane of the front side, and wherein the flexible base plate is configured to attain a bending radius.

2. The device as recited in claim 1, wherein the flexible channel is provided as a flexible corrugated hose or as a flexible corrugated pipe.

3. The device as recited in claim 1, wherein the device further comprises:

toothless sections at outer edges of at least one of the toothed sides, wherein, a toothless section adjoins the left side of the flexible base plate and a toothless section adjoins the right side of the flexible base plate.

4. The device as recited in claim 1, wherein the plurality of outlets are arranged in a repeating pattern.

5. A method of using the device as recited in claim 1 for applying of the at least one coating material as recited in claim 1, the method comprising:

providing the device as recited in claim 1; and using the device to apply the at least one coating material.

6. A method for producing a protective coating comprising:

providing the coating material recited in claim 1;

applying the coating material to a component via the device as recited in claim 1; and curing the coating material which was applied so as to obtain the protective coating.

7. The method as recited in claim 6, wherein at least one coating material for producing an erosion protection coating is/are used when providing the coating material.

8. The method as recited in claim 6, wherein, when applying the coating material to the component via the device, the coating material is applied to only one part of a surface of the component.

9. The method as recited in claim 6, wherein, when applying the coating material to the component via the device, the coating material is only applied to an edge of a rotor blade, to a wing, or to a hydrofoil.

10. The device as recited in claim 1, wherein the height section is equal to the length section.

11. The device as recited in claim 4, wherein, the flexible channel is further arranged at a distance from at least one of the toothed sides so that, during the applying the at least one coating material to the substrate surface, a reservoir for the at least one coating material is formed between the substrate surface and the device, and the distance and a size of the reservoir are provided so that, during the applying of the at least one coating material to the substrate surface, the at least one coating material flows off continuously and uniformly through the plurality of outlets.

12. The device as recited in claim 11, wherein the at least one sealing lip delimits the reservoir so that, during the applying the at least one coating material to the substrate surface, an undesired flowing off of the at least one coating material or a leakage of the at least one coating material is avoided.

13. The device as recited in claim 1, wherein the device is configured to apply the least one coating material to the substrate surface continuously, uniformly, without interruption, and with a constant layer thickness.

14. The device as recited in claim 1, wherein the substrate surface is an edge of a rotor blade, a wing, or a hydrofoil.

15. The device as recited in claim 1, wherein the bending radius of the flexible base plate is up to 10 mm.

* * * * *